United States Patent [19]

Usuki

[11] Patent Number: 6,106,895
[45] Date of Patent: Aug. 22, 2000

[54] MAGNETIC RECORDING MEDIUM AND PROCESS FOR PRODUCING THE SAME

[75] Inventor: Kazuyuki Usuki, Kanagawa-ken, Japan

[73] Assignee: Fuji Photo Film Co., Ltd., Kanagawa-ken, Japan

[21] Appl. No.: 09/037,053

[22] Filed: Mar. 9, 1998

[30] Foreign Application Priority Data

Mar. 11, 1997 [JP] Japan ................................. 9-055942

[51] Int. Cl.⁷ ................................................. B05D 7/04
[52] U.S. Cl. ........................................ 427/129; 427/387
[58] Field of Search ............................... 427/129, 387

[56] References Cited

U.S. PATENT DOCUMENTS

| | | | |
|---|---|---|---|
| 3,650,808 | 3/1972 | Gagnon | 117/72 |
| 5,064,687 | 11/1991 | Matsufuji et al. | 427/132 |
| 5,165,992 | 11/1992 | Yajima | 428/328 |

*Primary Examiner*—Stevan A. Resan
*Attorney, Agent, or Firm*—Sughrue, Mion, Zinn, Macpeak & Seas, PLLC

[57] ABSTRACT

A magnetic recording medium comprises a non-magnetic substrate and a magnetic layer, which is constituted of a thin ferromagnetic metal film and is overlaid upon at least either one of the surfaces of the non-magnetic substrate. A prime-coating layer, which contains a silicone resin having an aromatic hydrocarbon group, is formed between the non-magnetic substrate and the thin ferromagnetic metal film. The magnetic recording medium can be produced easily and at a low cost. The prime-coating layer has smooth surface characteristics and is free from deterioration of surface characteristics and the occurrence of cracking even during the formation of a magnetic layer thereon with a sputtering process, which is accompanied by heating of the substrate. Also, the prime-coating layer causes no blocking to occur and is uniform and capable of being subjected to a wet-on-wet coating technique.

12 Claims, No Drawings

MAGNETIC RECORDING MEDIUM AND PROCESS FOR PRODUCING THE SAME

BACKGROUND OF THE INVENTION

1. Field of the Invention

This invention relates to a magnetic recording medium, which comprises a magnetic layer constituted of a thin ferromagnetic metal film, and a process for producing the magnetic recording medium.

2. Description of the Prior Art

Ordinarily, magnetic recording media, such as magnetic tapes, floppy disks, and hard disks, have heretofore been produced with processes for forming a magnetic layer, a protective layer, and the like, on a non-magnetic substrate. As such magnetic recording media, magnetic recording media provided with a thin ferromagnetic metal film, which is formed with a vacuum film forming process, such as a sputtering process or a vacuum evaporation process, as the magnetic layer have widely been used in practice. The magnetic recording media provided with the magnetic layer, which is formed with the sputtering process or the vacuum evaporation process, have characteristics such that a high level of magnetic energy can be obtained easily. Also, the magnetic layer having a high level of surface smoothness can be obtained easily by rendering the surface of the non-magnetic substrate smooth. Therefore, the spacing loss can be kept small, and good electromagnetic characteristics can be obtained. Accordingly, the magnetic recording media provided with the magnetic layer, which is formed with the sputtering process or the vacuum evaporation process, are suitable as materials for recording magnetic information at high densities. In particular, the sputtering process is advantageous over the vacuum evaporation process in that the magnetic energy can be enhanced even further. Therefore, the sputtering process is employed for the production of magnetic recording media, such as hard disks, on which the magnetic information is to be recorded at high densities.

Nowadays, there is a strong demand for magnetic recording media on which the magnetic information can be recorded at high densities, and electromagnetic characteristics better than those in the past are required. Therefore, as for the magnetic recording media, such as magnetic tapes or floppy disks, in which the flexible polymer film, such as a polyethylene terephthalate film or a polyethylene naphthalate film, is employed as the non-magnetic substrate, such that, for example, the recording density may be enhanced, the magnetic layer constituted of a thin ferromagnetic metal film should preferably be formed with the sputtering process or the vacuum evaporation process.

However, the heat resistance of the polymer film is low. Therefore, in cases where the magnetic layer is formed on the polymer film with the sputtering process, or in cases where the magnetic layer is formed on the polymer film with the vacuum evaporation process at a high rate of vapor deposition, the problems occur in that the polymer film or its surface becomes heated and the non-magnetic substrate becomes deformed. Also, the problems occur in that the surface of the non-magnetic substrate is deteriorated due to separating of oligomers, or the like. As a result, it becomes difficult to obtain good surface smoothness of the non-magnetic substrate or the magnetic layer.

In order to solve the problems, the techniques described below have been proposed.

In one of the proposed techniques, a heat-resistant resin is utilized as the material for the polymer film serving as the non-magnetic substrate. It may be considered that a polyimide resin, or the like, may be employed as the heat-resistant resin. However, in general, polyimide resin films are expensive. Also, for technical reasons, it is difficult to prepare and use polyimide films having very smooth surfaces and good surface characteristics. Therefore, the proposed technique is not suitable for use in practice.

In different proposed techniques, a prime-coating layer is formed on, for example, a comparatively cheap polymer film, which is ordinarily used for the conventional magnetic recording media provided with a magnetic layer formed with a coating process, and the surface smoothness and the heat resistance of the film is thereby enhanced.

For example, in Japanese Unexamined Patent Publication No. 6(1994)-349042, a method for preparing a film having an appropriate level of surface characteristics is disclosed, wherein a resin layer containing fine grains is formed on a polymer film having a comparatively rough surface. However, in cases where ordinary resin binders employed in the disclosed method are used, if a magnetic layer is formed on the film with the sputtering process, the surface characteristics will be deteriorated markedly due to thermal damage.

Also, a method, wherein a polyethylene naphthalate is coated on a polyethylene terephthalate, and wherein the separating of oligomers due to heat is thereby restricted, is disclosed in, for example, Japanese Unexamined Patent Publication No. 7(1995)-225934. However, with the disclosed method wherein a polyethylene naphthalate is utilized, if the film is heated to a temperature of 200° C., which is ordinarily set in the sputtering process, the surface characteristics will be deteriorated due to the separating of oligomers.

Further, a method, wherein a polyamide resin or a polyimide resin having a high heat resistance is coated onto a polymer film, is disclosed in, for example, Japanese Unexamined Patent Publication No. 6(1994)-208717. In cases where such a material is used, a heat resistance capable of overcoming the temperature conditions in the sputtering process can be imparted to the polymer film. However, the polyamide resins and the polyimide resins have a low solubility in general-purpose solvents, and therefore solvents, which are difficult to process, must be used for such resins. Even if the resins were soluble in general-purpose solvents, since the viscosity of the solutions is high, a thin and uniform coating layer cannot be obtained, and it would be difficult to enhance the surface characteristics of the polymer film. Also, with the disclosed method, it is difficult to dry the solvent sufficiently, and the amount of the solvent remaining in the coating layer cannot be kept small. Therefore, the blocking readily occurs, and thus the coating layer, which has been formed on the front surface of the polymer film, and the back surface of the polymer film adhere to each other when the polymer film is wound up. Further, there is the risk that, when the magnetic layer is formed on the coating layer in a vacuum tank, the residual solvent volatilizes from the coating layer and contaminates the region in the vacuum tank.

In order for a coating layer having a high heat resistance to be obtained, it is efficient to form a coating layer of an inorganic material. For example, it may be considered to form a layer of silica, which is obtained from hydrolysis of a silane compound, or a layer of a metal oxide, which is obtained from a metal alkoxide. However, such a layer of the inorganic material cannot follow a thermal change of the non-magnetic substrate. As a result, cracks occur on the surface of the layer of the inorganic material, and the magnetic layer formed on the layer of the inorganic material also becomes cracked.

As a magnetic recording medium capable of solving the aforesaid problems to some extent, the applicant proposed a magnetic recording medium provided with a prime-coating layer, which is principally constituted of Si—O or Si—O—N, in Japanese Unexamined Patent Publication No. 8(1996)-329443. The proposed magnetic recording medium is provided with the prime-coating layer, which has smooth surface characteristics and is free from deterioration of surface characteristics and the occurrence of cracking even during the formation of a magnetic layer thereon with a sputtering process accompanied by heating of the substrate. Also, the prime-coating layer of the proposed magnetic recording medium causes no blocking to occur. However, when a coating composition for forming the prime-coating layer of the proposed magnetic recording medium is applied onto the non-magnetic substrate, run-away of the coating composition often occurs. Therefore, it was difficult to form a uniform prime-coating layer. Further, a wet-on-wet coating technique cannot be employed for the prime-coating layer of the proposed magnetic recording medium, and therefore the thickness of the prime-coating layer cannot be set to be large.

As described above, there has heretofore been proposed no prime-coating layer, which has smooth surface characteristics, which is free from deterioration of surface characteristics and the occurrence of cracking even during the formation of a magnetic layer thereon with a sputtering process accompanied by heating of the substrate, which does not cause blocking to occur, and which is uniform and is capable of being subjected to the wet-on-wet coating technique.

SUMMARY OF THE INVENTION

The primary object of the present invention is to provide a magnetic recording medium, which is provided with a specific prime-coating layer on a substrate and is capable of being produced easily and at a low cost, the prime-coating layer having smooth surface characteristics, being free from deterioration of surface characteristics and the occurrence of cracking even during the formation of a magnetic layer thereon with a sputtering process, which is accompanied by heating of the substrate, causing no blocking to occur, and being uniform and capable of being subjected to a wet-on-wet coating technique.

Another object of the present invention is to provide a process for producing the magnetic recording medium.

The inventor carried out extensive research to find compounds, which are suitable as the material for the prime-coating layer having the properties described above. As a result, it was found that silicone resins having aromatic hydrocarbon groups are appropriate as the material for the prime-coating layer.

The present invention provides a magnetic recording medium comprising a non-magnetic substrate and a magnetic layer, which is constituted of a thin ferromagnetic metal film and is overlaid upon at least either one of the surfaces of the non-magnetic substrate, wherein a prime-coating layer, which contains a silicone resin having an aromatic hydrocarbon group, is formed between the non-magnetic substrate and the thin ferromagnetic metal film.

In the magnetic recording medium in accordance with the present invention, the prime-coating layer may contain, as a principal constituent, a polymerization product of a silane coupling agent, which has an aromatic hydrocarbon group. Alternatively, the prime-coating layer may contain, as a principal constituent, a polymerization product of:
  a) a silane coupling agent, which has an aromatic hydrocarbon group, and
  b) a silane coupling agent, which has an organic residue having an epoxy group.

The present invention also provides a process for producing a magnetic recording medium, comprising the steps of:
  i) applying a coating composition onto a non-magnetic substrate, the coating composition containing a solution of a silane coupling agent, which has an aromatic hydrocarbon group, and
  ii) heating the applied coating composition such that the applied coating composition may be dried and such that the silane coupling agent may be polymerized, whereby a prime-coating layer is formed on the non-magnetic substrate.

The present invention further provides a process for producing a magnetic recording medium, comprising the steps of:
  i) applying a coating composition onto a non-magnetic substrate, the coating composition containing a solution of:
    a) a silane coupling agent, which has an aromatic hydrocarbon group, and
    b) a silane coupling agent, which has an organic residue having an epoxy group, and
  ii) heating the applied coating composition such that the applied coating composition may be dried and such that the silane coupling agents may be polymerized, whereby a prime-coating layer is formed on the non-magnetic substrate.

In the processes for producing a magnetic recording medium in accordance with the present invention, the coating composition may further contain a hardener, or the like. The hardener may be constituted of a metal chelate compound, or the like.

With the magnetic recording medium in accordance with the present invention, wherein the polymerization product layer containing the polymerization product of the silane coupling agent, which has the aromatic hydrocarbon group, is formed as the prime-coating layer on the non-magnetic substrate, the polymerization product layer comprises the siloxane bond. Also, with the magnetic recording medium in accordance with the present invention, wherein the polymerization product layer containing the polymerization product of (a) the silane coupling agent, which has the aromatic hydrocarbon group, and (b) the silane coupling agent, which has the organic residue having the epoxy group, is formed as the prime-coating layer on the non-magnetic substrate, the polymerization product layer comprises the siloxane bond and the bond, which is formed by the ring opening of the epoxy group. Therefore, the polymerization product layer has a higher heat resistance and better anti-blocking characteristics than those of the conventional polyester resin, or the like. Also, the polymerization product layer has better anti-cracking characteristics than those of a silica film, which is formed with a sol-gel process by using tetraethoxysilane as the starting material.

The aromatic hydrocarbon group imparts softness to the coating film, enhances the anti-cracking characteristics, and can achieve an appropriate level of surface energy. Therefore, the aromatic hydrocarbon group has the effects of reducing the run-away phenomenon, which occurs when the coating composition for the prime-coating layer is applied onto the non-magnetic substrate and dried. Particularly large effects can be obtained in cases where the surface of the non-magnetic substrate has defects, such as clinging of foreign substances. Also, in cases where a coating composition for a coating layer is applied onto the prime-coating layer, the coating composition can be applied such that it may not run away. Accordingly, the film thickness can be set to be large with the wet-on-wet coating technique.

With the processes for producing a magnetic recording medium in accordance with the present invention, wherein the solution of the monomer for the silicone resin is employed as the coating composition for forming the prime-coating layer, the viscosity of the coating composition can be kept low, and the prime-coating layer having a markedly high smoothness can be obtained. The prime-coating layer has a smoothness on the order of nanometers or sub-nanometer. Therefore, the prime-coating layer is very suitable for magnetic recording media, on which the magnetic information is to be recorded at high densities.

Further, the prime-coating layer has the characteristics such that, even if a plurality of magnetic recording media are placed on upon another, blocking due to migration of the constituents of the prime-coating layer may not occur.

DETAILED DESCRIPTION OF THE INVENTION

The silane coupling agent, which has the aromatic hydrocarbon group and is employed in the magnetic recording medium in accordance with the present invention, may be represented by, for example, Chemical Formula (1) shown below.

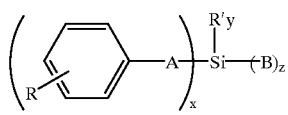

wherein each of R and R' represents a monovalent organic group, such as a methyl group, A represents a bivalent organic group, such as an alkylene group, or may be omitted, B represents a monovalent group selected from the group consisting of an alkoxy group, a halogen, and a hydroxyl group, and x+y+z=4.

In Chemical Formula (1) shown above, A should preferably be omitted or should preferably represents a methylene group. From the view point of the reactivity and the level of corrosiveness with respect to the magnetic layer, B should preferably be an alkoxy group. Such that the polymerization reaction may be facilitated, B should more preferably be an alkoxy group having at most four carbon atoms, such as a methoxy group. Also, x should preferably be 1 or 2. Such that the polymerization reaction may be facilitated, x should more preferably be 1. Further, y should preferably be 0 or 1. Such that the polymerization reaction may be facilitated, y should more preferably be 0. Therefore, z should particularly preferably be 3.

Examples of the silane coupling agent represented by Chemical Formula (1) include the compounds represented by Chemical Formula (2) shown below, and the like.

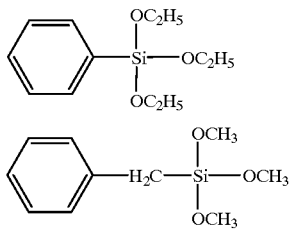

The silane coupling agent, which has the organic residue having the epoxy group and may be employed in the magnetic recording medium in accordance with the present invention, may be represented by Chemical Formula (3) shown below.

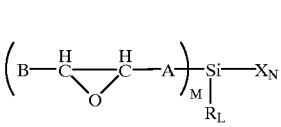

wherein A represents a bivalent organic residue, such as an alkylene group, B represents hydrogen or a monovalent organic residue, such as an alkyl group, R represents a monovalent organic residue, such as an alkyl group, X represents a monovalent group selected from the group consisting of an alkoxy group, a hydroxyl group, a halogen, and hydrogen, and L+M+N=4.

In Chemical Formula (3) shown above, A should preferably be hydrogen, and R should preferably be a monovalent organic residue, such as a methyl group or an ethyl group. From the view point of the reactivity and the level of corrosiveness with respect to the magnetic layer, X should preferably be an alkoxy group. Such that the polymerization reaction may be facilitated, X should more preferably be an alkoxy group having at most four carbon atoms, such as a methoxy group. Also, M should preferably be 1 or 2. Such that the polymerization reaction may be facilitated, M should more preferably be 1. L should preferably be 0 or 1. Such that the polymerization reaction may be facilitated, L should more preferably be 0. Therefore, N should particularly preferably be 3.

Examples of the silane coupling agent represented by Chemical Formula (3) include the compound represented by Chemical Formula (4) shown below, and the like.

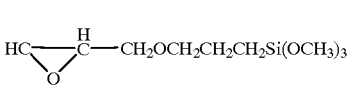

Such compounds are described in, for example, Japanese Unexamined Patent Publication Nos. 51(1976)-11871 and 63(1988)-23224.

When the coating composition containing the solution of the silane coupling agent, which has the aromatic hydrocarbon group, or the coating composition containing the solution of the silane coupling agent, which has the aromatic hydrocarbon group, and the silane coupling agent, which has the organic residue having the epoxy group, is applied onto the non-magnetic substrate and dried with the method, which will be described later, the alkoxysilane part, or the like, of the silane coupling agent undergoes hydrolysis and polymerization and forms the siloxane bond. Also, the epoxy group undergoes ring opening and polymerization due to an acid catalyst and heat. When necessary, the rate of the hydrolysis and the rate of the polymerization can be adjusted by the addition of an acid, such as hydrochloric acid.

In order to initiate the polymerization of the silane coupling agent at a low temperature, a hardener should preferably be utilized. Examples of the hardeners include various compounds, such as metal chelate compounds, organic acids and their salts, and perchlorates. From the view point of reduction in the hardening temperature and the level of corrosiveness with respect to the magnetic layer, metal chelate compounds should preferably be employed as the hardener. For example, in cases where aluminum acetylacetonate is added as the hardening catalyst to 3-glycidoxypropyltrimethoxysilane, hardening can be achieved by heating at a temperature of approximately 100° C. for a short period of time. Therefore, in such cases, hardening can be carried out even on a substrate having a low heat resistance, such as a polyethylene terephthalate. Accordingly, the prime-coating layer can be formed on the substrate with a continuous gravure coating process, and the substrate, on which the prime-coating layer has been formed, can be wound up such that no blocking may occur. As the hardener, chelate compounds of β-diketones and metals, such as aluminum acetylacetonate, zirconium acetylacetonate, and titanium acetylacetonate, are particularly preferable.

Such that the heat resistance may be kept high, such that the cost may be kept low, and such that the rate of the polymerization can be adjusted, the coating composition for the prime-coating layer may also contain, for example, a silane coupling agent, which has a hydrocarbon group, such as a methyl group. In cases where the silane coupling agent, which has the hydrocarbon group, is thus used together, the heat resistance of the prime-coating layer can be enhanced. The silane coupling agent, which has the hydrocarbon group, may be represented by the chemical formula shown below.

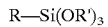

wherein each of R and R' represents a hydrocarbon group.

In order for the heat resistance of the prime-coating layer to be enhanced, the number of carbons of R should preferably be as small as possible.

The prime-coating layer is formed by applying the coating composition containing the silane coupling agent, which has the aromatic hydrocarbon group, or the coating composition containing the silane coupling agent, which has the aromatic hydrocarbon group, and the silane coupling agent, which has the organic residue having the epoxy group, onto the non-magnetic substrate. As a method for forming the prime-coating layer, a solution containing the silane coupling agent, the hardener, and hydrochloric acid in an organic solvent, such as methanol, may be applied onto the non-magnetic substrate with a coating technique, such as a wire bar coating process, a gravure coating process, a spray coating process, a dip coating process, or a spin coating process, and may then be dried. When necessary, the thus formed prime-coating layer may then be treated with heat, and the hardening may thereby be promoted. In this manner, the heat resistance, the solvent resistance, and the adhesion properties of the prime-coating layer can be enhanced.

The solvent used in the coating composition is determined in accordance with the amount of hydrochloric acid added and the structure of the silane coupling agent. By way of example, ethanol, methanol, isopropyl alcohol, cyclohexanone, or the like, may be used as the solvent.

The drying step is carried out in order to volatilize the solvent. The hardening may be carried out simultaneously with the drying step. The drying step may be carried out with an ordinary technique, such as hot-air drying or infrared drying. The drying temperature should preferably fall within the range of approximately 60° C. to approximately 150° C.

After the coating layer has been dried, it may be treated with heat such that the hardening may be promoted. As the heat treatment technique, hot-air heating, infrared heating, heated roller heating, or the like, may be utilized. The heating temperature may be selected in accordance with the thickness of the coating layer, the method used for forming the magnetic layer, and the temperature at which the magnetic layer is formed. In cases where the thickness of the coating layer is approximately 1am, the heating temperature may fall within the range of 100° C. to 250° C., and should preferably fall within the range of 120° C. to 200° C. If the heating temperature is lower than 100° C., the polymerization reaction will not occur sufficiently. If the heating temperature is higher than 250° C., the non-magnetic substrate will be deformed, or the productivity cannot be kept high.

The polymerization may also be carried out by irradiation of ultraviolet rays, irradiation of an electron beam, or the like.

The prime-coating layer in the magnetic recording medium in accordance with the present invention may also contain constituents other than the silane coupling agent, which has the aromatic hydrocarbon group, the silane coupling agent, which has the organic residue having the epoxy group, and the hardener. Thus the prime-coating layer may also contain additives, such as heat-resistant fine particles (a filler) for forming protrusions on the surface of the prime-coating layer, a metal alkoxide for adjusting the heat resistance and the hardness of the coating layer, a coupling agent for improving the adhesion with the substrate, and a rust preventive agent for preventing the magnetic layer from being oxidized.

The heat-resistant fine particles for forming the protrusions on the surface of the prime-coating layer may be constituted of an inorganic oxide, such as silica, alumina, titania, or zirconia; calcium carbonate, carbon, a polymer, or the like. The heat-resistant fine particles should preferably be monodisperse, spherical particles. The particle diameter may be selected in accordance with the thickness of the prime-coating layer. The particle diameter may fall within the range of 10 nm to 100 nm, and should preferably fall within the range of 20 nm to 100 nm. The coating composition employed for forming the prime-coating layer of the magnetic recording medium in accordance with the present invention primarily takes on the form of a solution in an alcohol. Therefore, the heat-resistant fine particles should preferably be used in the form of an organo-silica sol in an alcohol, a silica sol in an aqueous acid solution, or the like.

As the metal alkoxide for adjusting the heat resistance and the hardness of the coating layer, tetraethoxysilane, tetrapropoxyzirconium, or the like, may be employed. By the addition of the metal alkoxide, the heat resistance and the hardness of the coating layer can be enhanced.

In cases where the magnetic recording medium in accordance with the present invention takes on the form of a flexible medium, the non-magnetic substrate may be constituted of a film having a thickness falling within the range of 3 μm to 10 μm. The film may be constituted of a material, such as a polyethylene terephthalate, a polyethylene naphthalate, a polyimide, a polyamide, or a polyamideimide. The film may contain a filler, and protrusions may be formed on the surface of the film. In cases where the magnetic recording medium in accordance with the present invention takes on the form of a rigid medium, the non-magnetic substrate may be constituted of a glass, aluminum, or carbon.

The prime-coating layer employed in the present invention has good adhesion properties with respect to the substrate. In cases where the adhesion properties are to be enhanced, the substrate may be subjected to surface treatment with an additive, such as a silane coupling agent, oxygen plasma treatment, argon plasma treatment, exposure to ultraviolet rays, exposure to an electron beam, flame treatment, or the like.

The thin ferromagnetic metal film serving as the magnetic layer of the magnetic recording medium in accordance with the present invention may be formed with the known vacuum evaporation process, the known sputtering process, or the like.

In cases where the magnetic layer is formed with the sputtering process, a composition, which contains known metals or alloys and is primarily constituted of cobalt, may be employed as the composition, which is to be sputtered. Specifically, the composition, which is to be sputtered, may be constituted of Co—Cr, Co—Ni—Cr, Co—Cr—Ta, Co—Cr—Pt, Co—Cr—Ta—Pt, Co—Cr—Pt—Si, Co—Cr—Pt—B, or the like. In particular, such that the electromagnetic characteristics may be enhanced, Co—Cr—Ta or Co—Cr—Pt should preferably be employed. The thickness of the magnetic layer should preferably fall within the range of 10 nm to 300 nm. Also, in such cases, a primary layer for improving the magnetostatic characteristics of the magnetic layer should preferably be formed. As the composition for forming the primary layer, a composition containing known metals or alloys may be employed. For example, the composition for forming the primary layer may be constituted of Cr, V, Ti, Ta, W, Si, or an alloy of two or more of them. Among the above-enumerated materials, Cr, Cr—Ti, Cr—V, and Cr—Si are particularly preferable. The thickness of the primary layer may fall within the range of 5 nm to 500 nm, and should preferably fall within the range of 10 nm to 200 nm.

In cases where the magnetic layer is formed with the sputtering process, the formation of the magnetic layer should preferably be carried out while the substrate or the film is being heated. The temperature, at which the substrate or the film is heated, may fall within the range of approximately 150° C. to approximately 200° C.

In cases where the magnetic layer is formed with the vacuum evaporation process, a composition, which contains known metals or alloys and is primarily constituted of cobalt, may be employed as the composition which is to be evaporated. Specifically, Co, Co—Ni, Co—Fe, or the like, is subjected to vacuum evaporation in an oxygen atmosphere, and the magnetic layer containing oxygen is thereby formed on the non-magnetic substrate. In particular, such that the electromagnetic characteristics may be enhanced, the magnetic layer should preferably be constituted of a composition of Co—O, Co—Fe containing Co—O, or the like, in which cobalt constitutes at least 90% of the metal atoms constituting the magnetic layer. In the magnetic layer, cobalt should more preferably constitute at least 95% of the metal atoms constituting the magnetic layer. The thickness of the magnetic layer should preferably fall within the range of 100 nm to 300 nm, and should more preferably fall within the range of 120 nm to 200 nm.

Such that the electromagnetic characteristics may be enhanced even further, the thin ferromagnetic metal film may be constituted of a plurality of layers. Further, the magnetic recording medium may be provided with a non-magnetic primary layer or an intermediate layer.

The magnetic recording medium in accordance with the present invention may also be provided with a protective layer on the thin ferromagnetic metal film. By the provision of the protective layer, the durability against the movement operation and the corrosion resistance can be enhanced even further.

The protective layer may be constituted of an oxide, such as silica, alumina, titania, zirconia, cobalt oxide, or nickel oxide; a nitride, such as titanium nitride, silicon nitride, or boron nitride; a carbide, such as silicon carbide, chromium carbide, or boron carbide; or a carbon, such as graphite or amorphous carbon.

The carbon protective layer may be formed with a plasma-enhanced chemical vapor deposition (plasma-enhanced CVD) process, the sputtering process, or the like, and may have an amorphous structure, a graphite structure, a diamond structure, or a mixture of them. A hard carbon layer, which is ordinarily referred to as the diamond-like carbon layer, is particularly preferable. The hard carbon layer has a Vickers hardness of at least 1,000 kg/mm, and should preferably have a Vickers hardness of at least 2,000 kg/mm. The hard carbon layer has an amorphous crystal structure and is not electrically conductive. With a Raman spectroscopic analysis, the presence of the diamond-like carbon structure in the carbon layer can be confirmed by the detection of a peak at 1,520 $cm^{-1}$ to 1,560 $cm^{-1}$. If the structure of the carbon layer deviates from the diamond-like structure, the peak detected with the Raman spectroscopic analysis will shift from the aforesaid range, and the hardness of the carbon layer will become low.

The hard carbon protective film can also be formed with the plasma-enhanced CVD process from a carbon-containing compound, e.g. an alkane, such as methane, ethane, propane, or butane; an alkene, such as ethylene or propylene; or an alkyne, such as acetylene. The hard carbon protective film can further be formed with the sputtering process by using carbon as the target in a hydrogen atmosphere or a hydrocarbon atmosphere.

If the thickness of the hard carbon protective film is very large, the electromagnetic characteristics will become bad, or the adhesion properties with respect to the magnetic layer will become bad. Also, if the thickness of the hard carbon protective film is very small, the wear resistance will become insufficient. Therefore, the thickness of the hard carbon protective film should preferably fall within the range of 2.5 nm to 20 nm, and should more preferably fall within the range of 5 nm to 10 nm.

Such that the adhesion between the hard carbon protective film and a lubricating agent applied onto it may be enhanced, the surface of the hard carbon protective film may be treated with an oxidizing gas or an inert gas.

In order for the durability against the movement operation and the corrosion resistance of the magnetic recording medium in accordance with the present invention may be enhanced, a lubricating agent or a rust preventive agent should preferably be applied onto the magnetic layer or the protective layer.

As the lubricating agents, known hydrocarbon types of lubricating agents, known fluorine types of lubricating agents, known extreme pressure additives, and the like, may be employed.

Examples of the hydrocarbon types of lubricating agents include carboxylic acids, such as stearic acid and oleic acid; esters, such as butyl stearate; sulfonic acids, such as octadecylsulfonic acid; phosphoric esters, such as monooctadecyl phosphate; alcohols, such as stearyl alcohol and oleyl alcohol; carboxylic acid amides, such as stearic acid amide; and amines, such as stearylamine.

Examples of the fluorine types of lubricating agents include the lubricating agents, in which the alkyl groups in each of the above-enumerated hydrocarbon types of lubricating agents are substituted in whole or in part by fluoroalkyl groups or perfluoro polyether groups. Examples of the perfluoro polyether groups include perfluoromethylene oxide polymer groups, perfluoroethylene oxide polymer groups, perfluoro-n-propylene oxide polymer groups $\{(CF_2CF_2CF_2O)_n\}$, perfluoroisopropylene oxide polymer groups $\{(CF(CF_3)CF_2O)_n\}$, and the groups of copolymers of the above-enumerated oxides.

Examples of the extreme pressure additives include phosphoric esters, such as trilauryl phosphate; phosphites, such as trilauryl phosphite; thiophosphites, such as trilauryl trithiophosphite; thiophosphoric esters;

and sulfur types of extreme pressure additives, such as dibenzyl disulfide.

The above-enumerated lubricating agents may be used alone, or two or more of them may be used in combination.

In order for the lubricating agent to be applied onto the magnetic layer or the protective film, the lubricating agent may be dissolved in an organic solvent, and the resulting solution may be coated on the magnetic layer or the protective film with a technique, such as wire bar coating, gravure coating, spin coating, or dip coating. Alternatively, the lubricating agent may be applied to the magnetic layer or the protective film with a vacuum evaporation process.

The coating weight of the lubricating agent should preferably fall within the range of 1 mg/m² to 30 mg/m², and should more preferably fall within the range of 2 mg/m² to 20 mg/m².

Examples of the anticorrosive agents, which may be used for the magnetic recording medium in accordance with the present invention, include nitrogen-containing heterocyclic compounds, such as benzotriazole, benzimidazole, purine, and pyrimidine; derivatives obtained by introducing alkyl side chains into the nuclei of the above-enumerated nitrogen-containing heterocyclic compounds; heterocyclic compounds containing nitrogen and sulfur, such as benzothiazole, 2-mercaptobenzothiazole, tetraazaindene ring compounds, and thiouracil compounds; and derivatives of the above-enumerated heterocyclic compounds containing nitrogen and sulfur.

Examples of the tetraazaindene ring compounds capable of being used for the aforesaid purposes include the compounds which may be represented by the formula

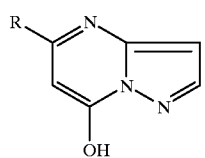

(5)

wherein R represents a hydrocarbon group selected from the group consisting of an alkyl group, an alkoxy group, and an alkyl amide group.

The hydrocarbon group represented by R in Chemical Formula (5) should preferably have 3 to 20 carbon atoms. Examples of the alkoxy groups include R'OCOCH$_2$—, in which R' represents $C_3H_7$—, $C_6H_{13}$—, or phenyl. Examples of the alkyl groups include $C_6H_{13}$—, $C_9H_{19}$—, and $C_{17}H_{35}$—. Examples of the alkyl amide groups include R"NHCOCH$_2$—, in which R" represents phenyl or $C_3H_7$—.

Examples of the thiouracil ring compounds include the compounds which may be represented by the formula

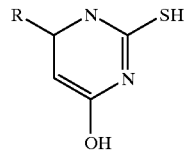

(6)

EXAMPLES

The present invention will further be illustrated by the following nonlimitative examples.

Example 1

Firstly, phenyltriethoxysilane, 3-glycidoxypropyltrimethoxysilane, and hydrochloric acid were dissolved in ethanol. (The weight ratio of phenyltriethoxysilane to 3-glycidoxypropyltrimethoxysilane was 1:1.) Aluminum acetylacetonate was then added as a hardener to the resulting solution, and a coating composition was thereby prepared. The coating composition was applied with a gravure coating process onto a substrate, which was constituted of a polyethylene naphthalate film having a thickness of 63 μm and the maximum protrusion roughness of 0.01 μm. Thereafter, the coating layer was dried at a temperature of 100° C., and a prime-coating layer having a thickness of 1 μm was thereby formed on the substrate. The coating layer was then heated at 170° C. for 20 seconds, and hardening and solvent removing treatment were thereby carried out. The substrate, on which the prime-coating layer had been formed, was then located in a sputtering apparatus, the temperature of the substrate was set to be 150° C., and a Cr—Ti primary layer having a thickness of 60 nm was formed on the prime-coating layer with a DC magnetron sputtering process. Subsequently, a Co—Cr—Pt magnetic layer having a thickness of 30 nm was formed on the primary layer.

Further, the substrate, on which the prime-coating layer, the primary layer, and the magnetic layer had been formed, was located in a plasma-enhanced CVD apparatus, and a hard carbon protective layer having a thickness of 20 nm was formed on the magnetic layer with a plasma-enhanced CVD process by using ethylene as the raw material. Thereafter, a solution containing a perfluoro polyether type of lubricating agent (Fomblin Z-DOL supplied by Ausimont Co.) in a fluorine type of solvent (FC-77 supplied by Sumitomo 3M Ltd.) was coated onto the protective layer with the gravure coating process, and a lubricating layer having a thickness of 2 nm was thereby formed on the protective layer. The primary layer, the magnetic layer, the protective layer, and the lubricating layer were formed on each of the opposite surfaces of the substrate. The thus obtained web was punched into a 3.7-inch magnetic disk shape, and a sample of a floppy disk was thereby prepared.

Example 2

A sample was prepared in the same manner as that in Example 1, except that, in lieu of phenyltriethoxysilane, benzyltriethoxysilane was employed.

Example 3

A sample was prepared in the same manner as that in Example 1, except that an organo-silica sol having a particle diameter of 25 nm in ethanol was added to the coating composition. (The proportion of the organo-silica sol was 5% by weight with respect to the total solid content.)

Example 4

A sample was prepared in the same manner as that in Example 1, except that, after the prime-coating layer was formed as in Example 1, a coating composition was further applied onto the prime-coating layer. The coating composition, which was thus applied onto the prime-coating layer, contained an organo-silica sol having a particle diameter of 25 nm in ethanol, phenyltriethoxysilane, 3-glycidoxypropyltrimethoxysilane, and hydrochloric acid in cyclohexanone. The coating composition, which had thus been applied onto the prime-coating layer, was then dried, and a prime-coating layer having a thickness of 10 nm was thereby formed on the previously formed prime-coating layer.

Comparative Example 1

A sample was prepared in the same manner as that in Example 1, except that the prime-coating layer was not formed, and the magnetic layer was formed directly on the polyethylene naphthalate film.

Comparative Example 2

A sample was prepared in the same manner as that in Example 1, except that a composition containing tetraethoxysilane, hydrochloric acid, and water in ethanol was employed as the coating composition.

Comparative Example 3

A sample was prepared in the same manner as that in Example 1, except that a composition containing methyltriethoxysilane, tetraethoxysilane (weight ratio between the two silanes=1:1), hydrochloric acid, and water in ethanol was employed as the coating composition.

Comparative Example 4

A sample was prepared in the same manner as that in Example 1, except that a composition containing a polyester resin (Vylon 200 supplied by Toyobo Co., Ltd.) in methyl ethyl ketone was employed as the coating composition.

Each of the thus prepared samples was evaluated with respect to the characteristics described below.
1) Occurrence of blocking after coating and drying of the prime-coating layer After the substrate, on which the prime-coating layer had been formed, was wound up, the occurrence of blocking to the substrate back surface (on which the coating layer had been formed) was investigated. The results were rated as follows:

○: The prime-coating layer could be separated from the substrate back surface without surface roughening occurring.

x: A sign of adhesion was observed, and whitening due to surface roughening occurred when the prime-coating layer was separated from the substrate back surface.

2) Surface characteristics

The surface of the prime-coating layer after being hardened and the surface of the finished medium were observed with an optical microscope (100-power magnification). In this manner, the occurrence of cracking, the occurrence of run-away of the coating composition for the prime-coating layer, and deterioration of the surface characteristics (occurrence of oligomers, or the like) due to thermal deformation were investigated. The results were rated as follows:

○: No change in surface characteristics was observed.

Δ: A change in surface characteristics was observed.

The results shown in Table 1 below were obtained.

TABLE 1

| Sample | Blocking of prime-coating layer | Cracking of prime-coating layer | Run-away of prime-coating composition | Cracking of medium | Surface roughening of medium |
|---|---|---|---|---|---|
| Ex. 1 | ○ | ○ | ○ | ○ | ○ |
| Ex. 2 | ○ | ○ | ○ | ○ | ○ |
| Ex. 3 | ○ | ○ | ○ | ○ | ○ |
| Ex. 4 | ○ | ○ | ○ | ○ | ○ |
| Comp. Ex. 1 | ○ | — | — | X | X |
| Comp. Ex. 2 | ○ | X | X | X | ○ |
| Comp. Ex. 3 | ○ | X | X | X | ○ |
| Comp. Ex. 4 | X | | | | |

What is claimed is:

1. A process for producing a magnetic recording medium, comprising the steps of:
   i) applying a coating composition onto a non-magnetic substrate, the coating composition containing a solution of a silane coupling agent, which has an aromatic hydrocarbon group,
   ii) heating the applied coating composition such that the applied coating composition may be dried and such that the silane coupling agent may be polymerized, whereby a prime-coating layer is formed on the non-magnetic substrate, and
   iii) forming a thin ferromagnetic metal thin film on said prime-coating layer.

2. A process for producing a magnetic recording medium, comprising the steps of:
   i) applying a coating composition onto a non-magnetic substrate, the coating composition containing a solution of:
      a) a silane coupling agent, which has an aromatic hydrocarbon group, and
      b) a silane coupling agent, which has an organic residue having an epoxy group,
   ii) heating the applied coating composition such that the applied coating composition may be dried and such that the silane coupling agents a) and b) may be polymerized, whereby a prime-coating layer is formed on the non-magnetic substrate, and
   iii) forming a ferromagnetic metal thin film on said prime-coating layer.

3. A process as defined in claim 1 wherein said coating composition further contains a hardener.

4. A process as defined in claim 3 wherein said hardener is constituted of a metal chelate compound.

5. A process as defined in claim 2 Wherein said coating composition further contains a hardener.

6. A process as defined in claim 5 wherein said hardener is constituted of a metal chelate compound.

7. A process as defined in claim 1 or 2, wherein said non-magnetic substrate comprises a material selected from the group consisting of polyethylene terephthalate, polyethylene naphthalate, polyimide, polyamide, polyamide-imide, glass, aluminum, and carbon.

8. A process as defined in claim 1 or 2, wherein said non-magnetic substrate is subjected to one of the options selected from the group consisting of a coating with a silane coupling agent, an oxygen plasma treatment, an argon plasma treatment, an ultraviolet ray exposure, an electron beam exposure, and a flame treatment.

9. A process as defined in claim 1 or 2, further comprising the step of applying onto said thin ferromagnetic film an agent selected from the group consisting of lubricating agents and anti-corrosive agents.

10. A process as defined in claim 1 or 2, further comprising the step of providing said magnetic recording medium with a protective layer on said thin ferromagnetic film.

11. A process as defined in claim 10, wherein said protective layer comprises a material selected from the group consisting of oxides, nitrides, carbides, and carbon.

12. A process as defined in claim 11, further comprising the step of applying onto said protective layer an agent selected from the group consisting of lubricating agents and anti-corrosive agents.

* * * * *